United States Patent
Rudaitis (12)

(10) Patent No.: US 11,275,359 B2
(45) Date of Patent: Mar. 15, 2022

(54) FIELDBUS CONTROLLER INTERFACE INCLUDING CONFIGURATION, MONITORING AND CONTROLLING FUNCTIONALITIES

(71) Applicant: Parker-Hannifin Corporation, Cleveland, OH (US)

(72) Inventor: Erick Rudaitis, Sterling Heights, MI (US)

(73) Assignee: Parker-Hannifin Corporation, Cleveland, OH (US)

( * ) Notice: Subject to any disclaimer, the term of this patent is extended or adjusted under 35 U.S.C. 154(b) by 0 days.

(21) Appl. No.: 16/650,204

(22) PCT Filed: Sep. 19, 2018

(86) PCT No.: PCT/US2018/051612
§ 371 (c)(1),
(2) Date: Mar. 24, 2020

(87) PCT Pub. No.: WO2019/125558
PCT Pub. Date: Jun. 27, 2019

(65) Prior Publication Data
US 2020/0264593 A1 Aug. 20, 2020

Related U.S. Application Data

(60) Provisional application No. 62/608,971, filed on Dec. 21, 2017.

(51) Int. Cl.
*G05B 19/418* (2006.01)
*G05B 19/042* (2006.01)
*H04L 12/40* (2006.01)

(52) U.S. Cl.
CPC ... *G05B 19/41855* (2013.01); *G05B 19/0423* (2013.01); *H04L 12/40013* (2013.01);
(Continued)

(58) Field of Classification Search
CPC ............ G05B 19/0423; G05B 19/0426; G05B 19/41855; G05B 2219/15038;
(Continued)

(56) References Cited

U.S. PATENT DOCUMENTS 9,805,528 B1 10/2017 Toepke et al.
2002/0065631 A1* 5/2002 Loechner ........... G05B 19/4185
702/188
(Continued)

FOREIGN PATENT DOCUMENTS

KR 101264403 B1 5/2013

OTHER PUBLICATIONS

International Search Report and Written Opinion of PCT/US2018/051612 dated Dec. 17, 2018.

*Primary Examiner* — Kidest Bahta
(74) *Attorney, Agent, or Firm* — Renner, Otto, Boisselle & Sklar, LLP

(57) ABSTRACT

A method for operating a fieldbus controller (2) having a plurality of I/O modules (4) is provided, the fieldbus controller (2) being coupled to a valve assembly (6) via the plurality of I/O modules (4). The method includes providing a user interface (8) for wirelessly operating the fieldbus controller (2), wherein providing the user interface (8) includes: providing a configuration interface (14) for configuring an operating mode of the plurality of I/O modules (4); providing a monitor interface (16) for reading status information from the plurality of I/O modules (4); and providing a control interface (18) for controlling a state of the plurality of I/O modules (4), the state of the plurality of I/O modules affecting a state of the valve assembly (6).

14 Claims, 13 Drawing Sheets

(52) U.S. Cl.
CPC ............. *G05B 2219/15038* (2013.01); *G05B 2219/25428* (2013.01); *G05B 2219/31121* (2013.01); *G05B 2219/31135* (2013.01); *H04L 2012/4026* (2013.01)

(58) Field of Classification Search
CPC ........... G05B 2219/25428; G05B 2219/31121; G05B 2219/31135; G05B 2219/34038; H04L 12/40013; H04L 2012/4026
See application file for complete search history.

(56) References Cited

U.S. PATENT DOCUMENTS

| | | | |
|---|---|---|---|
| 2008/0189441 A1* | 8/2008 | Jundt | G05B 19/042 710/3 |
| 2009/0228611 A1* | 9/2009 | Ferguson | G06F 8/60 710/8 |
| 2010/0141596 A1* | 6/2010 | Junk | G06F 3/04886 345/173 |
| 2010/0251159 A1* | 9/2010 | De Carolis | H05K 7/1479 715/771 |
| 2018/0113830 A1* | 4/2018 | Sherriff | G06F 13/4068 |

* cited by examiner

CONFIGURATION > VALVE CONFIG

VALVE CONFIGURATION

| ADDRESS | VALVE TAG | CONNECT | FAULT MODE | CYCLE LIMIT | CYCLE COUNT | RESET COUNT |
|---|---|---|---|---|---|---|
| 0 | VALVE 1 DUAL | ON | LAST KNOWN STATE ▷ | 1000 | 1000 | ▷ |
| 1 | VALVE 1 DUAL | ON | LAST KNOWN STATE ▷ | 1000 | 1000 | ▷ |
| 2 | VALVE 3 | ON | LAST KNOWN STATE ▷ | 1000 | 1000 | ▷ |
| 3 | VALVE 4 | ON | LAST KNOWN STATE ▷ | 1000 | 1000 | ▷ |
| 4 | VALVE 5 | ON | LAST KNOWN STATE ▷ | 1000 | 1000 | ▷ |
| 5 | VALVE 6 | ON | LAST KNOWN STATE ▷ | 1000 | 1000 | ▷ |
| 6 | VALVE 7 | ON | LAST KNOWN STATE ▷ | 1000 | 1000 | ▷ |
| 7 | VALVE 8 | ON | LAST KNOWN STATE ▷ | 1000 | 1000 | ▷ |
| 8 | VALVE 9 | ON | LAST KNOWN STATE ▷ | 1000 | 1000 | ▷ |
| 9 | H MICRO | ON | LAST KNOWN STATE ▷ | 1000 | 12 | ▷ |
| 10 | H MICRO | ON | LAST KNOWN STATE ▷ | 1000 | 555 | ▷ |
| 11 | H MICRO | ON | LAST KNOWN STATE ▷ | 1000 | 555 | ▷ |
| 12 | H MICRO | ON | LAST KNOWN STATE ▷ | 1000 | 4648 | ▷ |
| 13 | H MICRO | ON | LAST KNOWN STATE ▷ | 1000 | 78 | ▷ |
| 14 | H MICRO | OFF | LAST KNOWN STATE ▷ | 1000 | 6546 | ▷ |
| 15 | H MICRO | OFF | LAST KNOWN STATE ▷ | 1000 | 6546 | ▷ |

| ADDRESS | VALVE TAG | CONNECT | FAULT MODE | CYCLE LIMIT | CYCLE COUNT | RESET COUNT |
|---|---|---|---|---|---|---|
| 16 | VALVE 17 | OFF | TURN OFF ▷ | 1000 | 1000 | ▷ |
| 17 | VALVE 18 | OFF | TURN OFF ▷ | 1000 | 1000 | ▷ |
| 18 | VALVE 19 | OFF | TURN OFF ▷ | 1000 | 1000 | ▷ |
| 19 | VALVE 20 | OFF | TURN OFF ▷ | 1000 | 1000 | ▷ |
| 20 | VALVE 21 | OFF | TURN OFF ▷ | 1000 | 1000 | ▷ |
| 21 | VALVE 22 | OFF | TURN OFF ▷ | 1000 | 1000 | ▷ |
| 22 | VALVE 23 | OFF | TURN OFF ▷ | 1000 | 1000 | ▷ |
| 23 | VALVE 24 | OFF | TURN OFF ▷ | 1000 | 1000 | ▷ |
| 24 | VALVE 25 | ON | TURN OFF ▷ | 1000 | 1000 | ▷ |
| 25 | VALVE 26 | ON | TURN OFF ▷ | 1000 | 12 | ▷ |
| 26 | VALVE 27 | OFF | TURN OFF ▷ | 1000 | 555 | ▷ |
| 27 | VALVE 28 | OFF | TURN OFF ▷ | 1000 | 555 | ▷ |
| 28 | VALVE 29 | OFF | TURN OFF ▷ | 1000 | 4648 | ▷ |
| 29 | VALVE 30 | OFF | TURN OFF ▷ | 1000 | 78 | ▷ |
| 30 | VALVE 31 | OFF | TURN OFF ▷ | 1000 | 6546 | ▷ |
| 31 | VALVE 32 | OFF | TURN OFF ▷ | 1000 | 6546 | ▷ |

CANCEL   SAVE

FIG. 8

FIELDBUS CONTROLLER INTERFACE INCLUDING CONFIGURATION, MONITORING AND CONTROLLING FUNCTIONALITIES

RELATED APPLICATION DATA

This application is a national stage application pursuant to 35 U.S.C. § 371 of PCT/US2018/051612 filed on Sep. 19, 2018, which claims the benefit of U.S. Provisional Application No. 62/608,971 filed on Dec. 21, 2017, the contents of which are incorporated herein by reference.

TECHNICAL FIELD

This invention relates to the use of fieldbus controllers in an industrial factory network, and more particularly to a method and apparatus for remotely and wirelessly operating a fieldbus controller having a plurality of I/O modules coupled to a controlled device, such as a valve assembly or the like.

BACKGROUND

In an industrial factory network system, fieldbus controllers are used at the bottom of a control chain in order to link a user interface and a programmable logic controller to a plurality of instruments that actually carry out the work, such as sensors, actuators, electric motors, valve assemblies, etc. Fieldbus controllers typically contain a plurality of configurable I/O modules for connection to these instruments. In order to configure, monitor, or operate the fieldbus controller and the connected instruments during the commissioning phase of a control system, an operator typically accesses a user interface which may be located directly on or otherwise physically connected to the fieldbus controller.

Previous improvements to fieldbus technology have used a remote display device for the user interface, capable of communicating with the fieldbus controller, thereby allowing an operator to monitor the fieldbus controller remotely. These remote display devices allow an operator to, for example, view diagnostic and service information without having to access the sometimes hard-to-reach conventional user interface located on the fieldbus controller in the industrial factory network. These remote display devices, however, fail to transmit configuration data wirelessly, or otherwise facilitate configuration or control of the fieldbus controller and the connected instruments. With these remote devices, an operator would still need to access the fieldbus controller, or some other device that is physically connected to the fieldbus device, in order to achieve these functions.

SUMMARY

The present invention allows for remote and wireless configuration, monitoring, and control of a fieldbus controller and any instrument connected to the fieldbus controller. In this regard, an application and/or a webpage interface are provided for remotely and wirelessly operating a fieldbus controller connected to, for example, a valve assembly, by allowing an operator to wirelessly monitor the fieldbus controller (e.g., by viewing status information from the plurality of I/O modules), to configure the I/O modules (e.g., to configure the type of input/output), and to control the I/O modules (e.g., to force I/O points to specified values). Moreover, the present invention enables such wireless configuring, monitoring and control functions to be performed prior to the entire control network being installed. Furthermore, the present invention provides a web page or adaptable application, which is downloadable onto any portable hand-held electronic device such as a cell phone or tablet, to facilitate this method.

According to one aspect of the disclosure, a method for operating a fieldbus controller having a plurality of I/O modules, the fieldbus controller being coupled to a valve assembly via the plurality of I/O modules, comprises: providing a user interface for wirelessly operating the fieldbus controller. Providing a user interface includes providing a configuration interface for configuring an operating mode of the plurality of I/O modules, providing a monitor interface for reading status information from the plurality of I/O modules, and providing a control interface for controlling a state of the plurality of I/O modules, the state of the plurality of I/O modules affecting a state of the valve assembly.

According to one embodiment of the method, providing the user interface comprises accessing, via an electronic device, a webpage hosted by the fieldbus controller.

According to one embodiment of the method, the valve assembly includes at least one of an actuator or a feedback device, the method further comprising coupling an I/O module of the plurality of I/O modules to at least one of the actuator or the feedback device.

According to one embodiment of the method, providing the configuration interface includes configuring the plurality of I/O modules to at least one of restore factory defaults of the plurality of I/O modules, edit configuration parameters for the plurality of I/O modules, or update I/O module identification numbers.

According to one embodiment of the method, configuring three plurality of I/O modules includes defining a type of each of the plurality of I/O modules.

According to one embodiment of the method, defining the type of each of the plurality of I/O modules include selecting a type of I/O module to be at least one of a PNP module or an NPN module.

According to one embodiment of the method, the method further comprises using the monitor interface to read at least one of warnings from the fieldbus controller, events from the fieldbus controller, diagnostic data from the fieldbus controller, real-time status of the I/O modules, a visual layout of the I/O modules, or viewing device information.

According to one embodiment of the method, the method further comprises using the control interface to force at least one of an input or an output of an I/O module of the plurality of I/O modules to a high state or a low state.

According to one embodiment of the method, the method further comprises establishing a wireless communication connection between a portable hand-held electronic device and the fieldbus controller, and downloading the user interface from the fieldbus controller onto the portable hand-held electronic device.

According to one embodiment of the method, establishing a wireless communication connection includes using at least one of a Bluetooth, Ethernet or USB connection modality in the communication link.

According to another aspect of the disclosure, a non-transitory computer-readable medium including computer executable instructions for operating a fieldbus controller having a plurality of I/O modules comprises logic adapted to provide a user interface on a portable hand-held electronic device that is wirelessly couplable to the fieldbus controller. The logic adapted to provide the user interface includes a first logic for configuring an operating mode of the plurality of I/O modules, a second logic for reading status information from the plurality of I/O modules, and a third logic for controlling a state of the plurality of I/O modules.

According to one embodiment of the non-transitory computer-readable medium including computer executable instructions for operating a fieldbus controller having a plurality of I/O modules, the fieldbus controller is coupled to a controlled device via the plurality of I/O modules.

According to one embodiment of the non-transitory computer-readable medium including computer executable instructions for operating a fieldbus controller having a plurality of I/O modules, the controlled device includes at least one of an actuator or a feedback device and at least one of the plurality of I/O modules is coupled to at least one of the actuator or the feedback device.

According to one embodiment of the non-transitory computer-readable medium including computer executable instructions for operating a fieldbus controller having a plurality of I/O modules, the first logic for configuring an operating mode of the plurality of I/O modules includes at least one of a logic for configuring the plurality of I/O modules to restore factory defaults of the plurality of I/O modules, a logic for configuring the plurality of I/O modules to edit configuration parameters for the plurality of I/O modules, or a logic for configuring the plurality of I/O modules to update I/O modules identification numbers.

According to one embodiment of the non-transitory computer-readable medium including computer executable instructions for operating a fieldbus controller having a plurality of I/O modules, the first logic for configuring an operating mode of the plurality of I/O modules further includes a logic for defining a type of each of the plurality of I/O modules.

According to one embodiment of the non-transitory computer-readable medium including computer executable instructions for operating a fieldbus controller having a plurality of I/O modules, the logic for defining a type of each of the plurality of I/O modules includes a logic for selecting a type of I/O module to be at least one of a PNP module or an NPN module.

According to one embodiment of the non-transitory computer-readable medium including computer executable instructions for operating a fieldbus controller having a plurality of I/O modules, the second logic for reading status information from the plurality of I/O modules includes at least one of a logic for reading warnings from the fieldbus controller, a logic for reading events from the fieldbus controller, a logic for reading diagnostic data from the fieldbus controller, a logic for reading real-time status of the I/O modules, a logic for reading a visual layout of the I/O modules, or a logic for reading device information.

According to one embodiment of the non-transitory computer-readable medium including computer executable instructions for operating a fieldbus controller having a plurality of I/O modules, the third logic for controlling a state of the plurality of I/O modules includes a logic for forcing at least one of an input or an output of an I/O module of the plurality of I/O modules to a high state or a low state.

According to another aspect of the disclosure, a fieldbus controller comprises a plurality of I/O modules connectable to a controlled device, a processor and memory, a wireless communication interface operatively coupled to the processor, and logic stored in the memory and executable by the processor. The logic, when executed by the processor, provides via the wireless communication interface a user interface for operating the fieldbus controller. The user interface includes a configuration interface for configuring an operating mode of the plurality of I/O modules, a monitor interface for reading status information from the plurality of I/O modules, and a control interface for controlling a state of the plurality of I/O modules, the state of the plurality of I/O modules affecting a state of the controlled device.

According to one embodiment of the fieldbus controller, the configuration interface includes an interface for configuring the plurality of I/O modules to at least one of restore factory defaults of the plurality of I/O modules, edit configuration parameters for the plurality of I/O modules, or update I/O module identification numbers.

According to one embodiment of the fieldbus controller, the configuration interface includes an interface for defining a type of each of the plurality of I/O modules.

According to one embodiment of the fieldbus controller, defining the type of each of the plurality of I/O modules includes selecting a type of I/O module to be at least one of a PNP module or an NPN module.

According to one embodiment of the fieldbus controller, the fieldbus controller further comprises logic configured to download via the wireless communication interface an application from the fieldbus controller onto an electronic device, wherein the application is configured to provide the user interface on a display of the electronic device.

According to one embodiment of the fieldbus controller, the fieldbus controller further comprises logic configured to host a webpage accessible by an electronic device, the webpage providing the user interface.

The foregoing and other features of the invention are hereinafter described in greater detail with reference to the accompanying drawings.

BRIEF DESCRIPTION OF THE DRAWINGS

Embodiments of this invention will now be described in further detail with reference to the accompanying drawing, in which:

FIG. 5 is a schematic diagram of an exemplary user interface of a hand-held device in accordance with the invention for operating a fieldbus controller;

FIG. 6A is a schematic diagram of an exemplary configuration interface of a hand-held device in accordance with the invention;

FIG. 6B is a schematic diagram of an exemplary configuration interface of a hand-held device for configuring I/O modules connected to the fieldbus controller in accordance with the invention;

FIG. 8 is a schematic diagram of an exemplary control interface of a hand-held device in accordance with the invention;

DETAILED DESCRIPTION OF THE DRAWINGS

Figure 1:
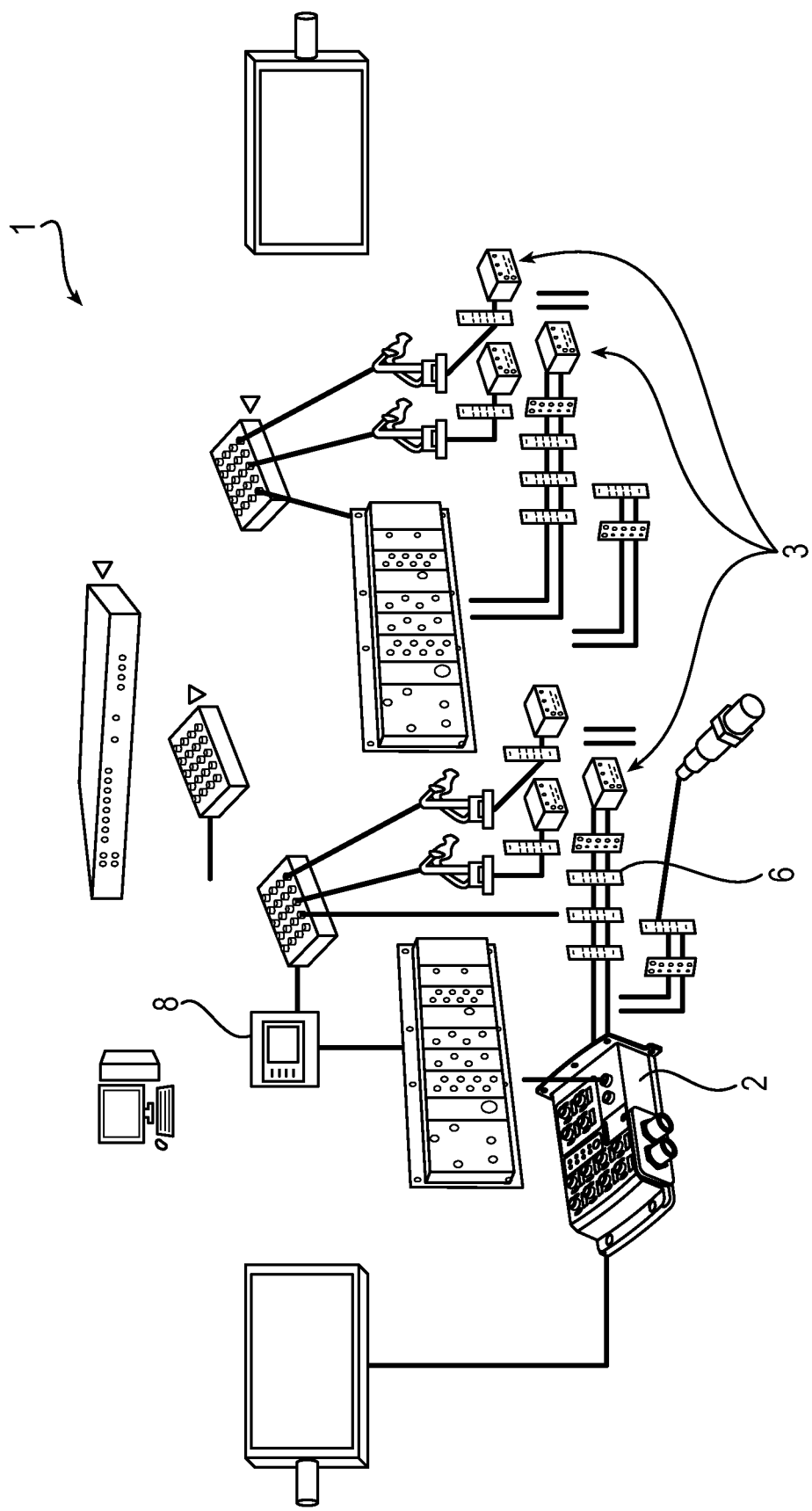
FIG. 1 is a schematic diagram of an exemplary industrial factory network system.

Embodiments will now be described with reference to the drawings, wherein like reference numerals are used to refer to like elements throughout. It will be understood that the figures are not necessarily to scale. Further, features that are described and/or illustrated with respect to one embodiment may be used in the same way or in a similar way in one or more other embodiments and/or in combination with or instead of the features of the other embodiments.

Described below in conjunction with the appended figures are various embodiments of an industrial factory network system including a fieldbus controller having a plurality of I/O modules, the fieldbus controller being coupled to, for example, a valve assembly via the plurality of I/O modules, and a method for operating the fieldbus controller. Though the invention will be described with respect to the fieldbus controller coupled to a valve assembly, the invention may be applicable to the fieldbus controller coupled with any industrial instrument within an industrial factory network system.

In one embodiment, an application is stored on the fieldbus controller, the application operative to provide an interface for operating the fieldbus controller (e.g., configuring, monitoring and controlling the fieldbus controller). The application can be transferred to a portable device, such as a mobile phone, tablet, or the like, and executed on the portable device. When executed, the application provides a user interface on the portable device.

In another embodiment, a fieldbus controller hosts a webpage interface for configuring the fieldbus controller. An electronic device can wirelessly access the webpage to configure, monitor and control the fieldbus controller.

With initial reference to FIG. 1, an exemplary industrial factory network system 1 is illustrated. The industrial factory network system 1 may include a plurality of industrial instruments 3 for controlling one or more machines. The industrial factory network system 1 may also include a fieldbus controller 2 having a plurality of I/O modules 4, through which the plurality of industrial instruments 3 may be controlled. The industrial factory network system 1 may also include a user interface 8 by which an operator may configure the plurality of I/O modules 4 on the fieldbus controller 2, monitor the fieldbus controller 2 and the industrial instruments 3 by viewing status and diagnostic data from the fieldbus controller 2, and control the operation of the industrial instruments 3 via the fieldbus controller 2.

Figure 2A:
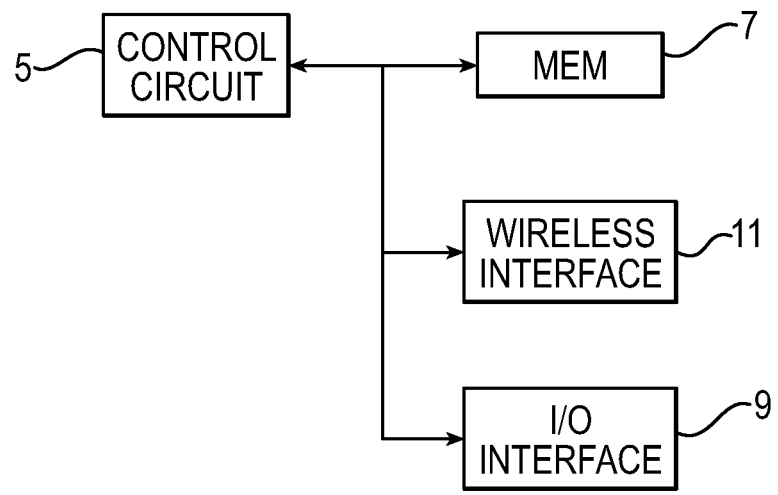
FIG. 2A is a schematic block diagram illustrating modules of an exemplary fieldbus controller.
Figure 2B:
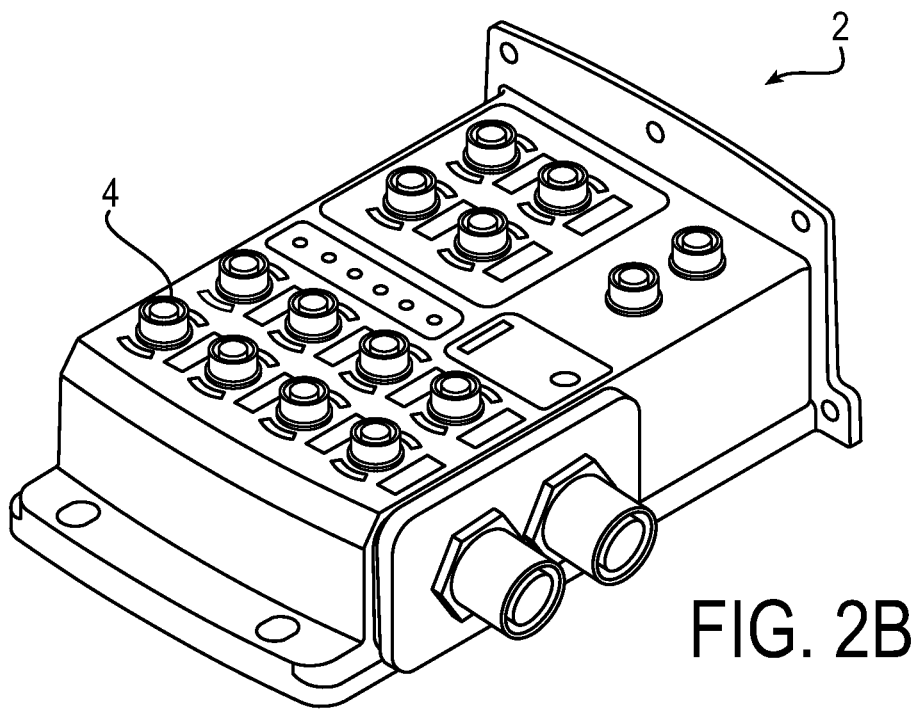
FIG. 2B is a perspective view of an exemplary fieldbus controller.
Figure 2C:
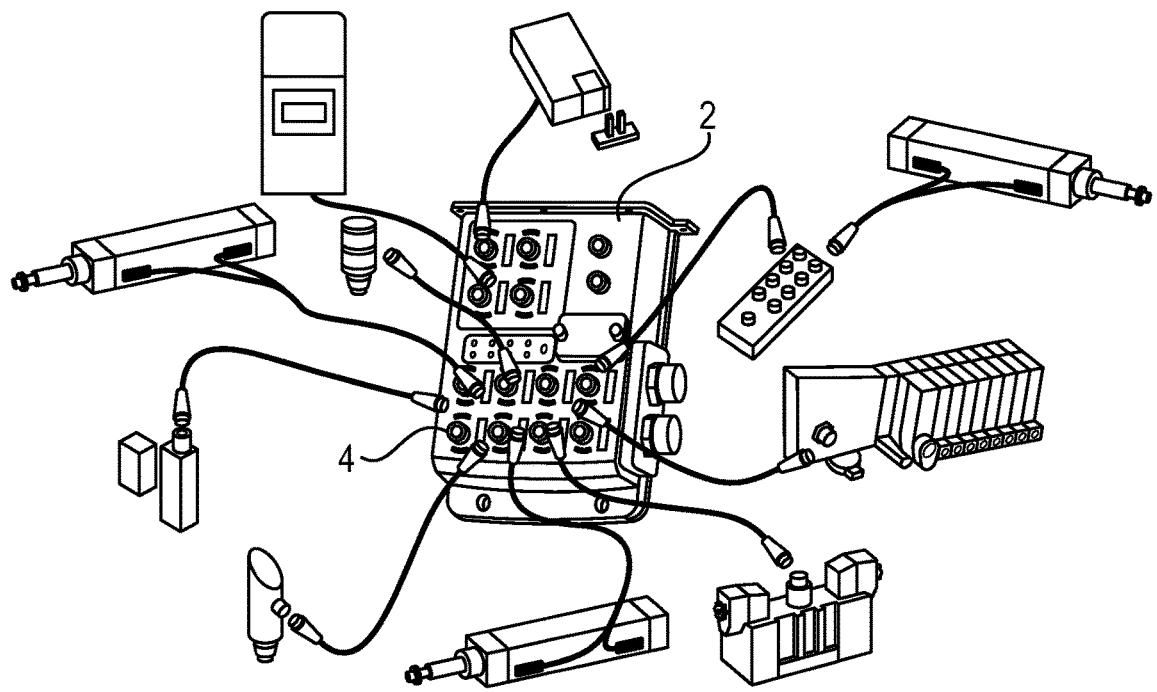
FIG. 2C is a schematic diagram of I/O port options on the fieldbus controller of FIG. 2B.

With reference to FIGS. 2A-C, an exemplary fieldbus controller 2 used in the industrial factory network system 1 is shown. FIG. 2A depicts a schematic block diagram of an exemplary fieldbus controller 2. The fieldbus controller 2 may include a control circuit 5 that is responsible for overall operation of the fieldbus controller 2. In one embodiment, the control circuit 5 may include a processor that executes operating instructions. The processor of the control circuit 5 may be a central processing unit (CPU), a microcontroller, or a microprocessor that executes code in order to carry out operation of the fieldbus controller 2. The fieldbus controller 2 may also include memory 7. The memory 7 may be, for example, one or more of a buffer, a flash memory, a hard drive, a removable media, a volatile memory, a non-volatile memory, a random access memory (RAM), or other suitable device. In a typical arrangement, the memory 7 includes a non-volatile memory for long term data storage and a volatile memory that functions as a system memory for the control circuit 5. The memory 7, which stores a user interface in the form of an application and/or webpage, may exchange data with the control circuit 5 over a data bus. Accompanying control lines and an address bus between the memory 7 and the control circuit 5 also may be present. The memory 7 is considered a non-transitory computer readable medium.

The fieldbus controller 2 may also include interfaces for establishing communication with a plurality of industrial controllers 3, such as a valve assembly 6. An exemplary interface is an input/output (I/O) interface 9 in the form of an electrical connector and interface circuitry for establishing connectivity to an industrial controller 3 using a wired connection. Another exemplary interface is a wireless interface 11 for communicating with a portable hand-held electronic device 10. The wireless interface 11 may be, for example, an interface that operates in accordance with Bluetooth standards, WiFi standards, or another wireless standard. Multiple wireless interfaces 11 may be present to operate over multiple standards.

FIG. 2B depicts an exemplary fieldbus controller 2 having a plurality of I/O modules 4 for establishing input and output connections with a plurality of industrial instruments 3 within the industrial factory network system 1. The I/O modules may be digital inputs, digital outputs, analog inputs, analog outputs, or any other conventional I/O module. The fieldbus controller 2 may also include network connector ports, such as Ethernet ports, as well as power supply ports. The fieldbus controller 2 may also have a Bluetooth switch and LED indicators at each I/O module, port, and/or switch. FIG. 2C depicts the fieldbus controller 2 connected to a plurality of industrial instruments 3 via the I/O modules 4. The industrial instruments may include, for example, valve assemblies (e.g., pneumatic control valve assemblies or hydraulic control valve assemblies), motor controllers, sensors, actuators, or any other conventional industrial instrument used in an industrial factory network system. The input and output connections between the fieldbus controller and the plurality of industrial instruments 3 allow the operator of the industrial factory network system 1 to control the plurality of industrial instruments 3 via the fieldbus controller 2. Each I/O module 4 is capable of being configured according to its desired purpose. For example, I/O module 4 may be defined as at least one of a PNP module or an NPN module. In another embodiment, each I/O module 4 has four connectors. Each connector has two I/O pins that can be configured as either as a PNP or NPN. Further, the plurality of I/O modules 4 may be configured to at least one of restore factory defaults of the plurality of I/O modules, edit configuration parameters for the plurality of I/O modules, or update I/O module identification numbers.

Figure 3:
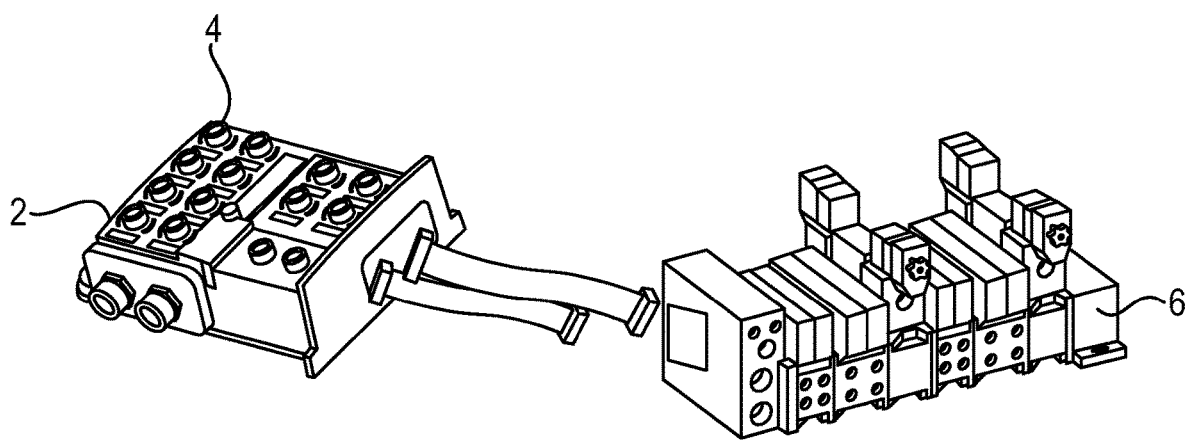
FIG. 3 is a schematic diagram of the connection between the fieldbus controller of FIG. 2B and a valve assembly.

Referring to FIG. 3, a cable connection between the fieldbus controller 2 and a valve assembly 6 is shown. The cable connection electrically connects an I/O module 4 to a corresponding device on the valve assembly 6. The valve assembly 6 may be one of the industrial instruments 3 that are connected to the plurality of I/O modules 4 on the fieldbus controller 2 and controlled by the operator via the fieldbus controller 2. The valve assembly 6 may include at least one of an actuator or a feedback device (not shown), to which an I/O module 4 of the plurality of I/O modules 4 on the fieldbus controller 2 may be coupled with. The actuator may be a solenoid actuator or the like, while the feedback device may be a switch that provides an indication of the state of the solenoid and/or valve. This allows the valve assembly 6 to be controlled by the fieldbus controller 2, for example, by commanding (e.g., forcing) the state of the I/O module 4 to which it is connected on the fieldbus controller 2 to either a high state or a low state, i.e. on or off, thereby affecting the state of the solenoid and thus the valve assembly 6.

Figure 4A:
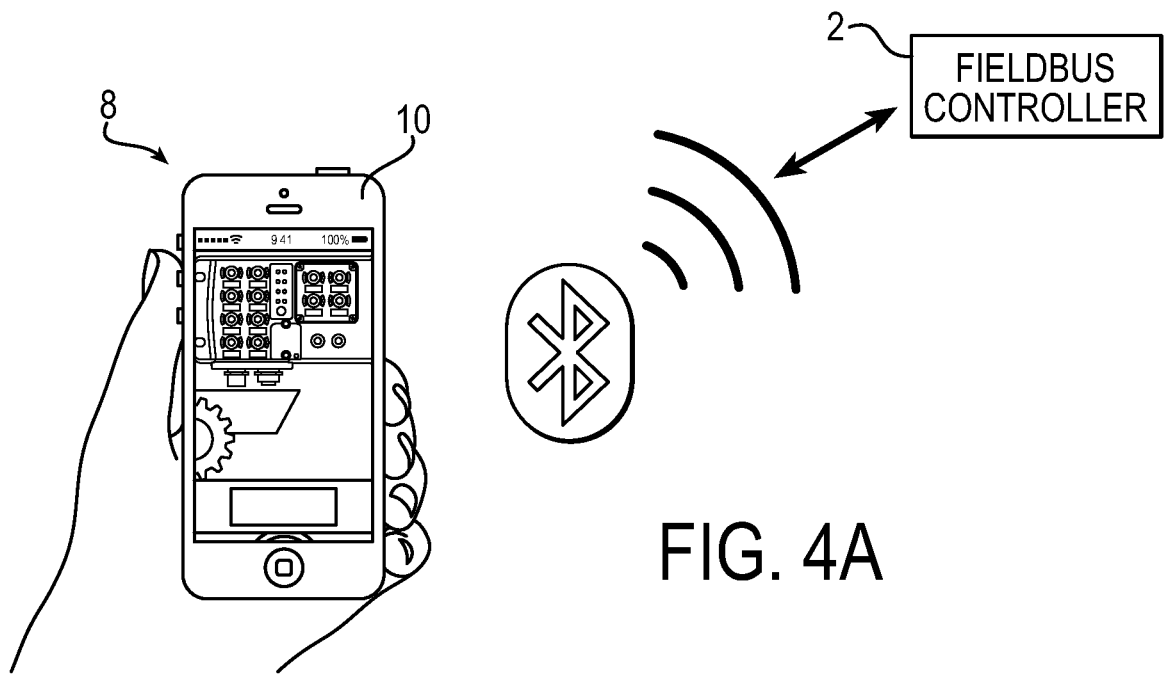
FIG. 4A is a schematic diagram of a wireless communication connection between a hand-held device and the fieldbus controller.
Figure 4B:
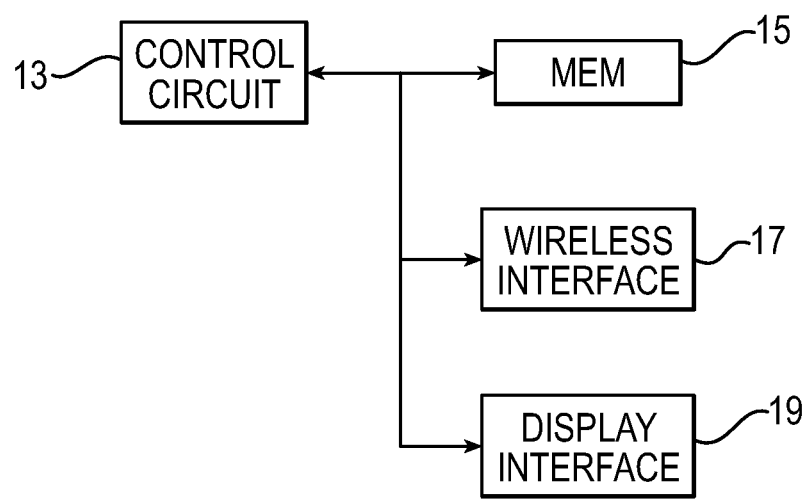
FIG. 4B is a schematic block diagram of an exemplary hand-held device.

Referring to FIGS. 4A-B, according to an aspect of the invention, a method of controlling the fieldbus controller 2, and therefore, the valve assembly 6, wirelessly and remotely is achieved by the use of a user interface 8, in the form of a configuration tool application which is downloadable onto a portable hand-held electronic device 10. According to another aspect of the invention, the fieldbus controller 2 may be wirelessly and remotely controlled by the use of a user interface 8 displayed on a web page hosted by the fieldbus controller. The user interface 8 of the present invention allows for remote and wireless communication with the fieldbus controller 2, such that an operator may not only monitor the fieldbus controller 2 and valve assembly 6 remotely, but also configure and control the plurality of I/O modules 4 on the fieldbus controller 2 that are connected to the actuator or feedback device of the valve assembly 6, thereby affecting a state of the valve assembly 6. With the user interface 8 of the present invention, all of these functions may be achieved wirelessly and remotely via a wireless communication connection between the portable hand-held electronic device 10 and the fieldbus controller 2. Such wireless and/or remote connection may be, for example, via at least one of a Bluetooth, Ethernet or USB connection modality in the communication link.

FIG. 4B depicts a schematic block diagram of an exemplary portable hand-held electronic device 10 for controlling a fieldbus controller 2. The portable hand-held electronic device 10 includes a control circuit 13 that is responsible for overall operation of the portable hand-held electronic device 10. In one embodiment, the control circuit 13 may include a processor that executes operating instructions. The processor of the control circuit 13 may be a central processing unit (CPU), a microcontroller, or a microprocessor that executes code in order to carry out operation of the portable hand-held electronic device 10. The portable hand-held electronic device 10 may also include memory 15. The memory 15 may be, for example, one or more of a buffer, a flash memory, a hard drive, a removable media, a volatile memory, a non-volatile memory, a random access memory (RAM), or other suitable device. In a typical arrangement, the memory 15 includes a non-volatile memory for long term data storage and a volatile memory that functions as a system memory for the control circuit 13. The memory 15 may exchange data with the control circuit 13 over a data bus. Accompanying control lines and an address bus between the memory 15 and the control circuit 13 also may be present. The memory 15 is considered a non-transitory computer readable medium. The portable hand-held electronic device 10 may also include interfaces for establishing communication with the fieldbus controller 2. An exemplary interface is a wireless interface 17. The wireless interface 17 may be, for example, an interface that operates in accordance with Bluetooth standards, WiFi standards, or another wireless standard. Multiple wireless interfaces 17 may be present to operate over multiple standards. The portable hand-held electronic device 10 may also include a display interface 19 for displaying a user interface 8 for controlling the fieldbus controller 2.

Figure 5:
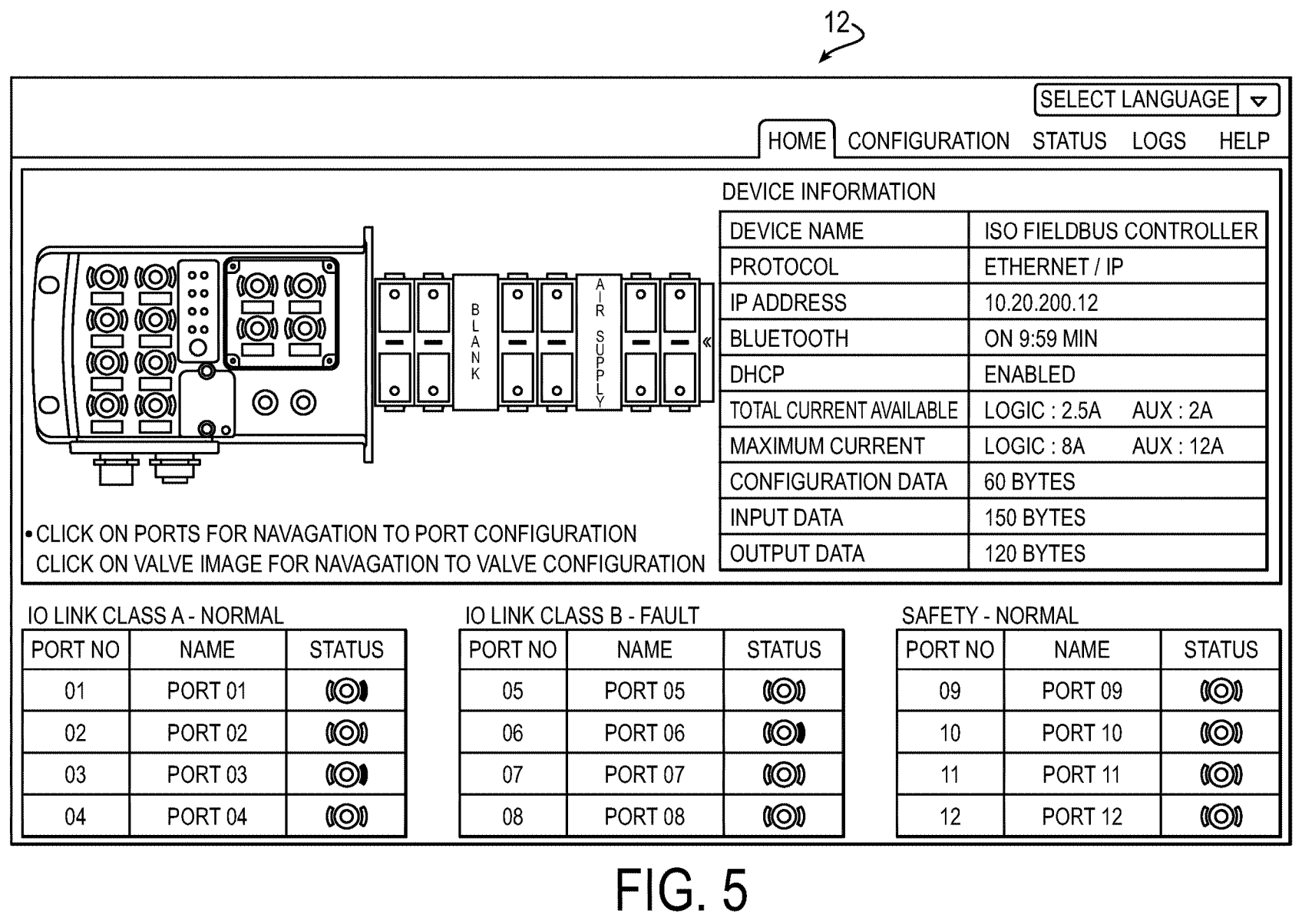

Referring to FIG. 5, a home page 12 of a configuration tool user interface 8 is shown. The home page 12 of the interface may display valve assembly device information, fieldbus information, and instructions for added features. Navigation tabs may be provided at the top of the homepage for navigation to other interfaces within the user interface 8, such as the configuration interface 14, the monitor interface 16, or the control interface 18. In an exemplary embodiment, a graphical depiction of the fieldbus controller 2 and the valve assembly 6 may be displayed on the top left of the home page 12. Device information may be displayed in tabular form on the top right of the home page 12. Further, information concerning the communication links, I/O module identification, and status of I/O modules may be displayed in tabular or graphical form across the bottom of the home page 12.

Figure 6A:
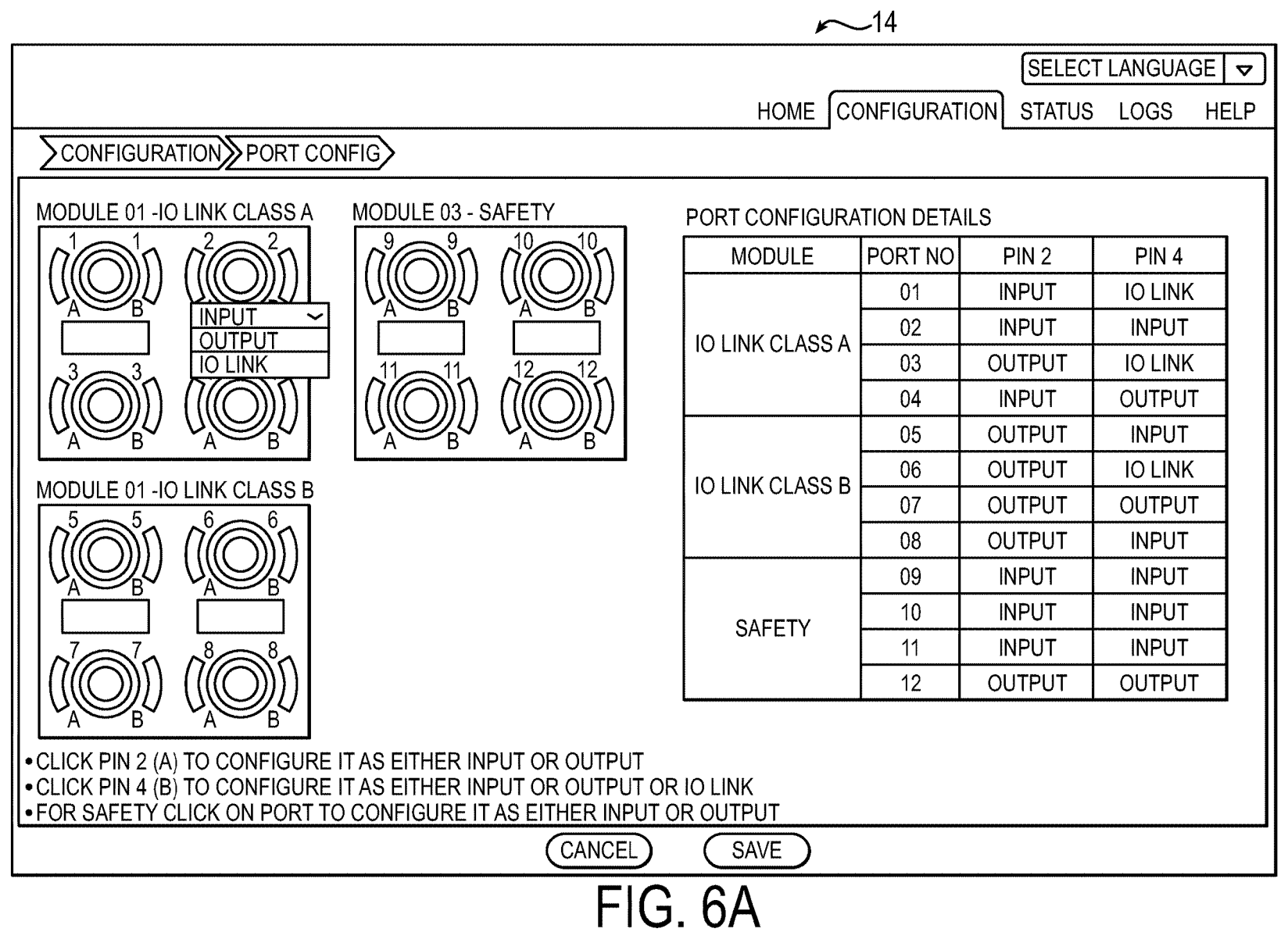
Figure 6B:
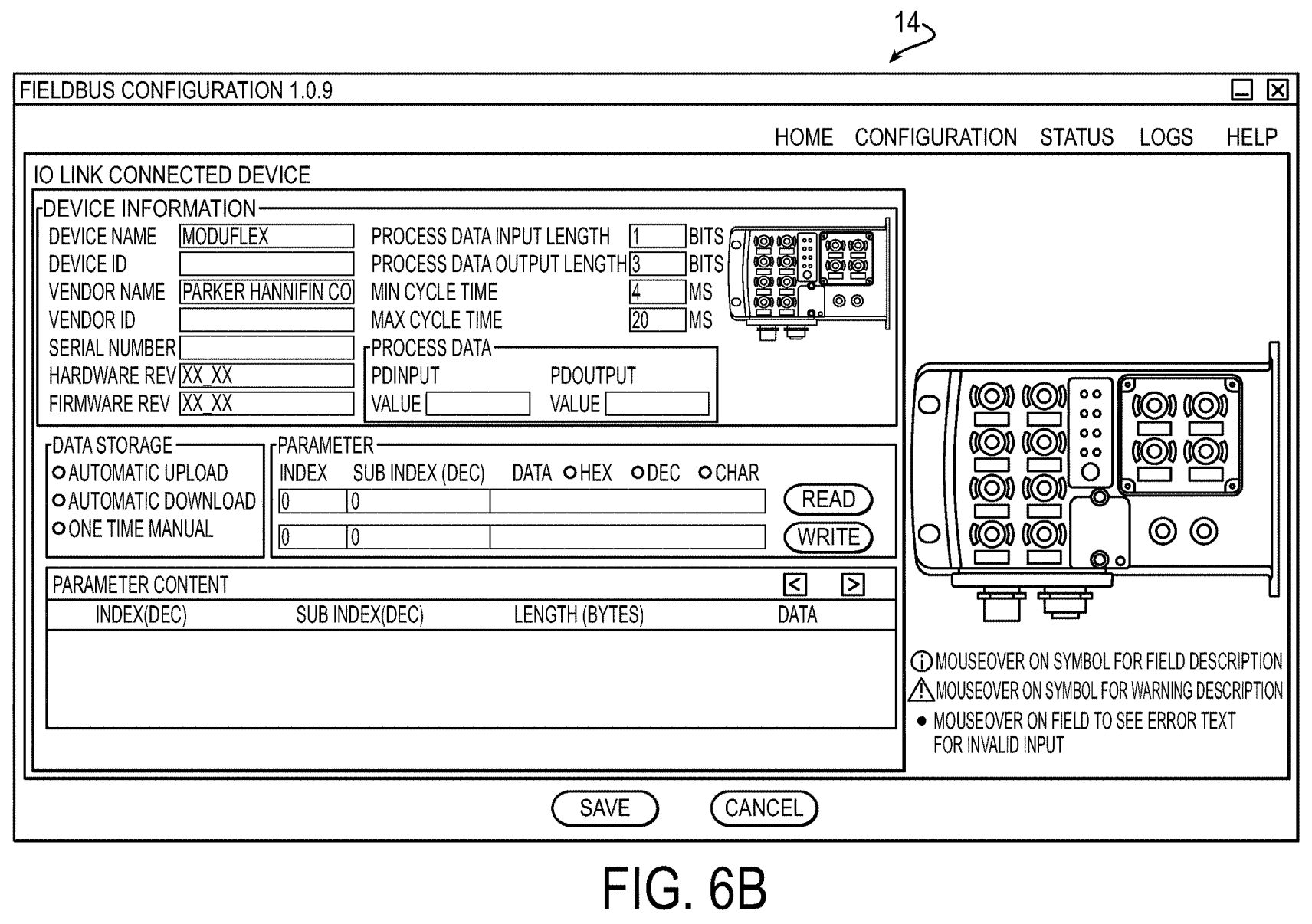
Figure 6C:
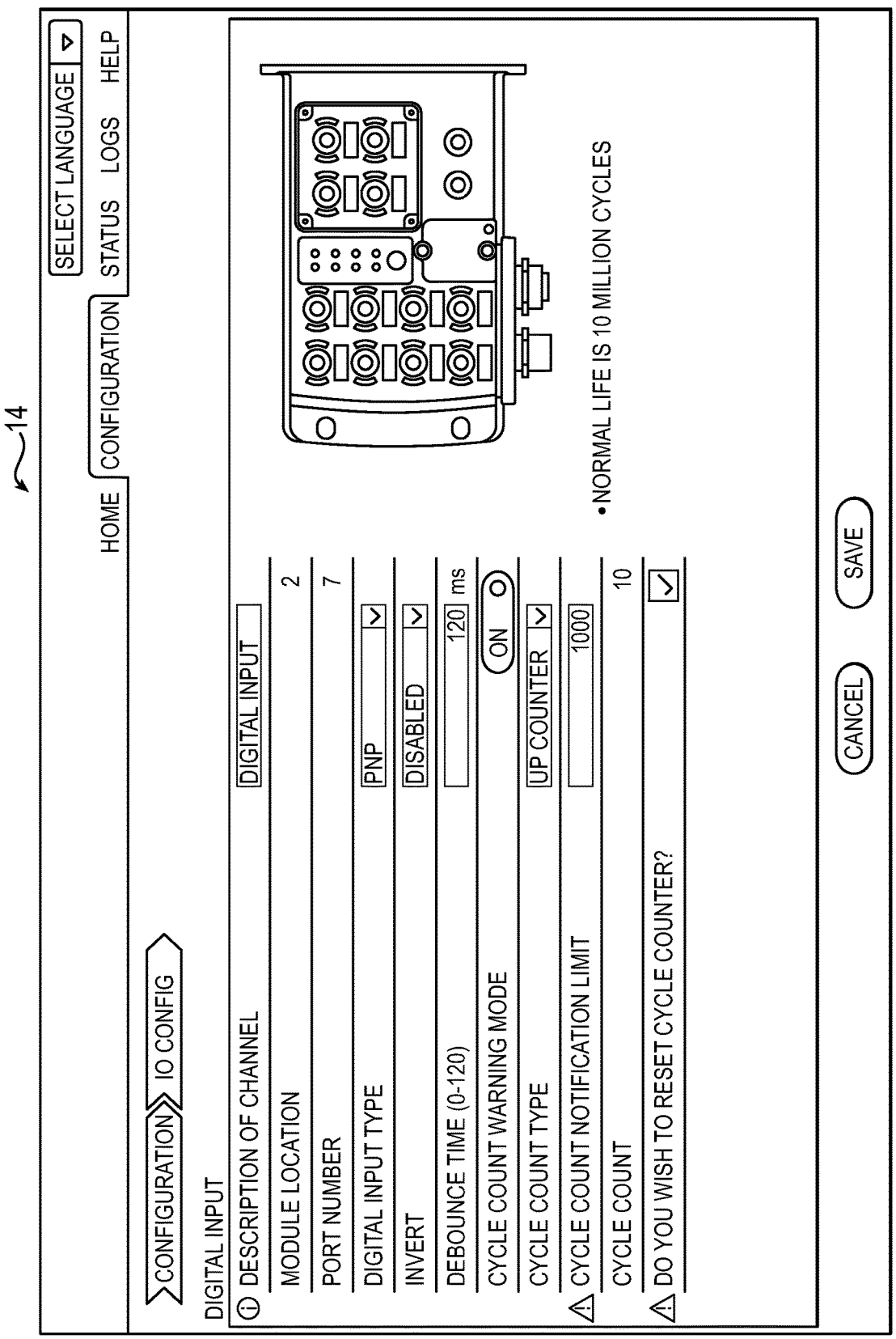
FIG. 6C is a schematic diagram of an exemplary configuration interface of a hand-held device for configuring digital inputs on the fieldbus controller in accordance with the invention.
Figure 6D:
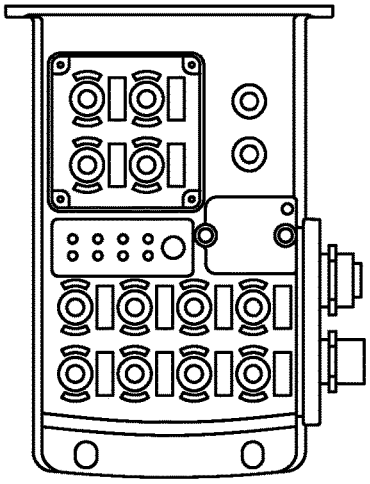
FIG. 6D is a schematic diagram of an exemplary configuration interface of a hand-held device for configuring digital outputs on the fieldbus controller in accordance with the invention.

Referring to FIGS. 6A-D, the user interface 8 used in the method of the present invention includes a configuration interface 14 for configuring the plurality of I/O modules on the fieldbus controller 2. Via the user interface, the operator may configure I/O functions, such as defining a type of communication (i.e. I/O Link). The operator may also configure other communication parameters, restore factory defaults, view or edit system and network configuration parameters, save or load configuration settings to or from a computer, or choose and update part numbers of the power connector and zone options. FIG. 6A-B depict exemplary configuration interface 14 screens for configuring the plurality of I/O modules 4 connected to the fieldbus controller. For example, FIG. 6A illustrates the current configuration status of the I/O modules and also enables the user to select whether an I/O module will be an input device or an output device. The interface of FIG. 6B, in addition to providing status information, enables a user to configure the name of the I/O module, communication parameters of the I/O module, and data storage functions of the I/O module. FIG. 6C depicts a configuration interface for configuration of I/O module parameters for I/O modules designated as input modules and FIG. 6D depicts a configuration interface for configuration of I/O module parameters for I/O modules designated as output modules. With these configuration interfaces, the operator may configure digital output parameters, cycle count parameters, the desired behavior for outputs in case of fault during normal operation (e.g., as either "hold last output state" or "turn OFF," whenever a fault is encountered). The configuration interface 14 may provide an option to apply the selected output behavior to "all outputs the same" or to be configured as "point-by-point" per output. The configuration interface may also allow an operator to configure digital input parameters and cycle count parameters. Although not shown, it will be appreciated that a similar interface may be provided for analog I/O modules of the fieldbus controller.

Figure 7:
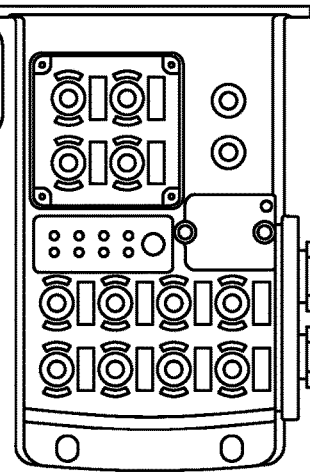
FIG. 7 is a schematic diagram of an exemplary monitor interface of a hand-held device in accordance with the invention.

Referring to FIG. 7, the user interface 8 used in the method of the present invention also includes a monitor interface 16 for reading status information from the plurality of I/O modules 4. The monitor interface 16 may display in a tabular and/or graphical representation the real-time status of the I/O module and, thus, of the valve assembly (or other device) connected to the I/O module. The monitor interface 16 may also display a legend for LED color indication of the I/O modules and a table of LED color statuses to enable an operator to readily interpret the status of various items on the interface. The monitor interface 16 may include a display to view warnings, events, and diagnostic data.

Referring to FIG. 8, the user interface 8 used in the method of the present invention also includes a control interface 18 for controlling a state of the plurality of I/O modules 4, the state of the plurality of I/O modules 4 affecting a state of the valve assembly 6. For example, a user may force the state of an I/O module to a desired value in order to achieve a desired result. The control interface 18 also allows an operator to modify the table of valve configuration details.

Figure 9:
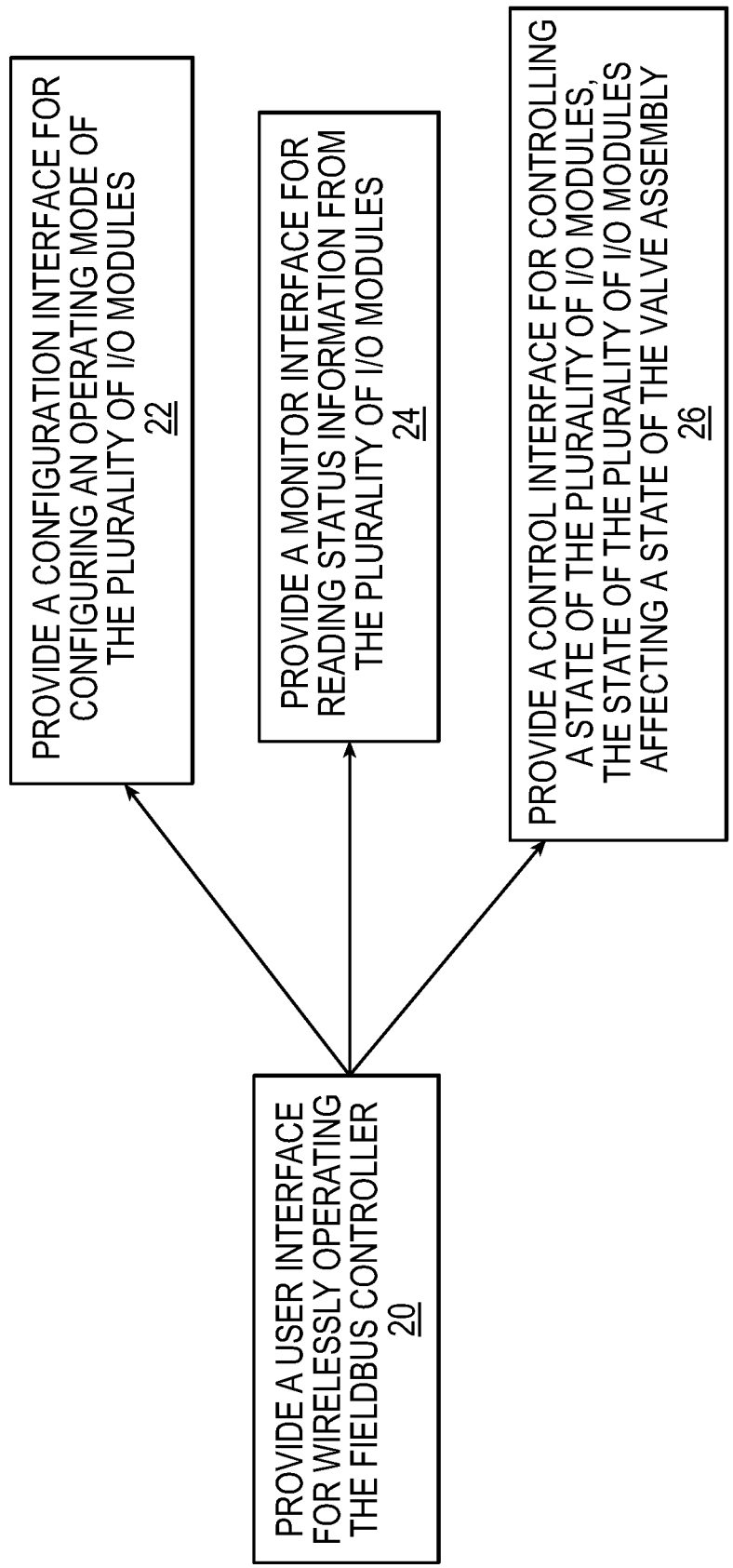
FIG. 9 is a flowchart of an exemplary method for operating a fieldbus controller in accordance with the invention.

Referring to FIG. 9, illustrated is a flow diagram representing steps of a method in accordance with the invention that may be carried out by a fieldbus controller, a hand-held controller, or a combination of a fieldbus controller and a hand-held controller. Although illustrated in a logical progression, the illustrated blocks may be carried out in other orders and/or with concurrence between two or more blocks. Therefore, the illustrated flow diagram may be altered (including omitting steps or adding steps) and/or may be implemented in an object-oriented manner or in a state-oriented manner.

Beginning at block 20, a user interface is provided for wirelessly operating the fieldbus controller. In block 22, the provided user interface can include a configuration interface for configuring an operating mode of the plurality of I/O modules. The configuration interface may be presented on a portable hand-held device in response to a user command, e.g., a soft key pressed by the user. Additionally, Bluetooth connectivity may be initiated by a user via the portable hand-held device. As discussed above with respect to FIGS. 6A-6C, the configuration interface enables the user to configure each I/O point by manipulating soft keys of the interface. For example, the user may configure the plurality of I/O modules to at least one of restore factory defaults of the plurality of I/O modules, edit configuration parameters for the plurality of I/O modules, or update I/O module identification numbers. The user may also define a type of each of the plurality of I/O modules, which can include, for example, selecting a type of I/O communication (i.e. I/O link), or selecting a type of I/O module to be at least one of a PNP module or an NPN module. The user may also configure the adaptable I/O modules for the use of different communication networks (e.g. I/O Link A, I/O Link B), aux output, or other configurable I/O. The user may also configure the I/O modules as an optional safety module for allowing safety inputs and outputs to be monitored.

Next, as indicated at block 24, the provided user interface can include a monitor interface for reading status information from the plurality of I/O modules. The monitor interface also may be presented on a portable hand-held electronic device in response to a user command, such as a soft key or other means (e.g., touch screen entry, button entry, etc.). For example, the user may use the monitor interface to read at least one of warnings from the fieldbus controller, events from the fieldbus controller, diagnostic data from the fieldbus controller, real-time status of the I/O modules, a visual layout of the I/O modules, or view device information. The monitor interface allows for the display of diagnostic data such as voltage, logic, safety inputs and outputs, as well as any other possible I/O module uses.

At block 26, the provided user interface can include a control interface for controlling a state of the plurality of I/O modules (the state of the plurality of I/O modules affecting a state of the valve assembly). Like the configuration and monitor interfaces, the provided control interface can be presented on a portable hand-held electronic device in response to a user command. The control interface enables a user to directly control a state of each I/O module. For example, a user can force a state of a digital input to either a high state or a low state, regardless of the actual state of the input device attached to the I/O module. Thus, if a switch connected to an input module is in a closed state, this normally would be presented by that input module as a TRUE state (e.g., logic 1). However, via the control interface the user can override this state and "force" the I/O module to a FALSE state (e.g., logic 0). Similarly, the user, via the control interface, can "force" the state of an output module TRUE or FALSE. This can be advantageous during commissioning of a control system that employs such fieldbus modules, particularly, when a main or central controller is not yet online. For example, the control interface may aid in the integration check out and debut when a programmable logic controller (PLC) is not connected to the fieldbus controller.

Figure 10:
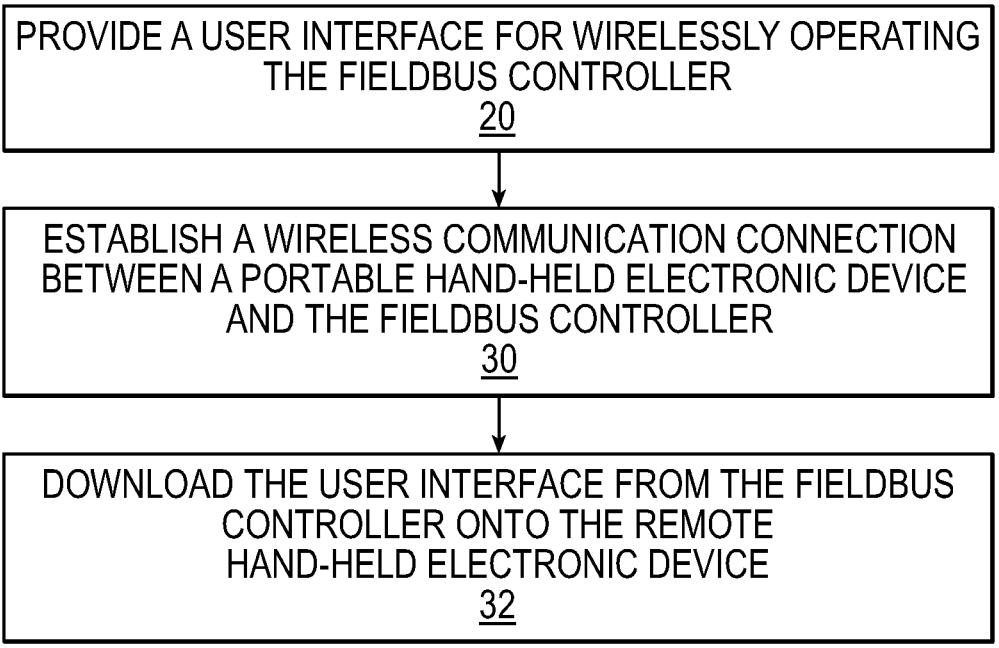
FIG. 10 is a flowchart of another exemplary method for operating a fieldbus controller in accordance with the invention.

Referring to FIG. 10, the method of the present invention further includes transferring an application operative as described above to a portable hand-held electronic device 10. In block 30, the method may include establishing a wireless communication connection between a portable hand-held electronic device 10 and the fieldbus controller 2. In block 32, the method may further include downloading the application from the fieldbus controller 2 onto the portable hand-held electronic device 10, and executing the application.

Figure 11:
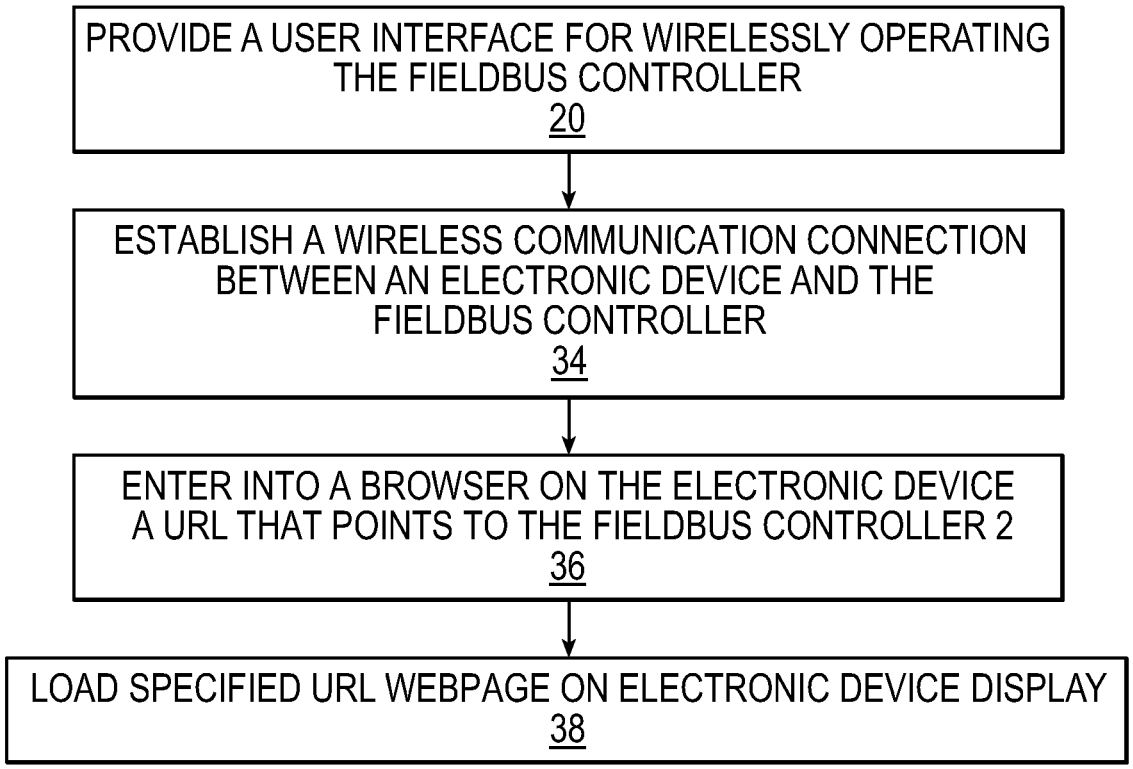
FIG. 11 is a flowchart of another exemplary method for operating a fieldbus controller in accordance with the invention.

Referring to FIG. 11, in another embodiment, the interface may be presented on a webpage hosted by the fieldbus controller 2. In other embodiments, the webpage may be hosted by a PC configuration tool connected to the fieldbus controller 2 via a USB connection. In block 34 in this embodiment, the method includes establishing a wireless communication connection between an electronic device, such as a hand-held controller, a PC, a tablet, etc., and the fieldbus controller 2. In block 36, a user then may enter in a browser a URL address or the like that points to the fieldbus controller 2, and the browser then proceed to the specified URL via a wireless connection to the fieldbus controller 2. In step 38, the specified URL webpage is loaded onto the electronic device and displayed. Establishing the wireless communication connection may include using at least one of a Bluetooth, Ethernet or USB connection modality in a communication link.

In an embodiment, a Bluetooth connection is activated remotely over a network or alternatively, via a hardware button located on the fieldbus controller 2 or via the user interface on the portable hand-held device. The active time period of Bluetooth connectivity may be viewed or modified by the operator via the user interface on the portable hand-held electronic device. The default active time of Bluetooth connectivity may be 10 minutes, but may be customized to up to 60 minutes.

Accordingly, the present invention enables a user to quickly and easily configure I/O modules 4 of a fieldbus controller 2, monitor the status of the fieldbus controller 2, and control the fieldbus controller 2, even when a master controller for the fieldbus devices is not yet online. This enables integrators, or maintainenance personell, to check wiring and functions of the I/O modules 4, set up sensors, and ensure that the valve assembly is connected correctly prior to the complete control system being online.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

The invention claimed is:

1. A method for operating a fieldbus controller having a plurality of I/O modules, the fieldbus controller being coupled to a controlled device via the plurality of I/O modules, the method comprising:
providing, via Bluetooth connectivity between the fieldbus controller and a portable hand-held electronic device, a user interface to the portable hand-held electronic device for an active time period for wirelessly operating the fieldbus controller, wherein providing the user interface includes:
providing a configuration interface for configuring an operating mode of the plurality of I/O modules, wherein providing the configuration interface includes configuring the plurality of I/O modules including defining a type of each of the plurality of I/O modules, and wherein defining the type of each of the plurality of I/O modules includes selecting the type of I/O module to be at least one of a PNP module or an NPN module;
providing a monitor interface for reading status information from the plurality of I/O modules; and
providing a control interface for controlling a state of the plurality of I/O modules, the state of the plurality of I/O modules affecting a state of the controlled device.

2. The method of claim 1, wherein providing the user interface comprises accessing, via an electronic device, a webpage hosted by the field bus controller.

3. The method according to any one of claim 1, wherein the controlled device includes at least one of an actuator or a feedback device, the method further comprising coupling an I/O module of the plurality of I/O modules to at least one of the actuator or the feedback device.

4. The method of any one of claim 1, wherein providing the configuration interface includes configuring the plurality of I/O modules to at least one of restore factory defaults of the plurality of I/O modules, edit configuration parameters for the plurality of I/O modules, or update I/O module identification numbers.

5. A non-transitory computer-readable medium including computer executable instructions for operating a fieldbus controller having a plurality of I/O modules, wherein the computer executable instructions are executed to perform the steps of:
providing, via Bluetooth connectivity between the fieldbus controller and a portable hand-held electronic device a user interface to the portable hand-held electronic device for an active time period,
the computer executable instructions further being adapted to perform the steps of:
configuring an operating mode of the plurality of I/O modules, wherein configuring the operating mode of the plurality of I/O modules includes defining a type of each of the plurality of I/O modules, and wherein defining the type of each of the plurality of I/O modules includes selecting the type of I/O module to be at least one of a PNP module or an NPN module;
reading status information from the plurality of I/O modules; and
controlling a state of the plurality of I/O modules.

6. The non-transitory computer-readable medium including computer executable instructions for operating a fieldbus controller having a plurality of I/O modules of claim 5, wherein the fieldbus controller is coupled to a controlled device via the plurality of I/O modules.

7. The non-transitory computer-readable medium including computer executable instructions for operating a fieldbus controller having a plurality of I/O modules of claim 6, wherein the controlled device includes at least one of an actuator or a feedback device and at least one of the plurality of I/O modules is coupled to at least one of the actuator or the feedback device.

8. The non-transitory computer-readable medium including computer executable instructions for operating a fieldbus controller having a plurality of I/O modules of claim 5, wherein configuring an operating mode of the plurality of I/O modules includes configuring the plurality of I/O modules to restore factory defaults of the plurality of I/O modules, and
the computer executable instructions further are adapted to perform the steps of configuring the plurality of I/O modules to edit configuration parameters for the plurality of I/O modules, or configuring the plurality of I/O modules to update I/O module identification numbers.

9. The non-transitory computer-readable medium including computer executable instructions for operating a fieldbus controller having a plurality of I/O modules of any one of claim 5, wherein reading status information from the plurality of I/O modules includes reading warnings from the fieldbus controller, and
the executable instructions further are adapted to perform the steps of reading events from the fieldbus controller, reading diagnostic data from the fieldbus controller, reading real-time status of the I/O modules, for reading a visual layout of the I/O modules, or reading device information.

10. A fieldbus controller, comprising:
a plurality of I/O modules connectable to a controlled device;
a processor and memory;
a wireless communication interface operatively coupled to the processor and configured to provide Bluetooth connectivity between the fieldbus controller and a portable hand-held electronic device for an active time period; and
computer executable instructions stored in the memory and executable by the processor, wherein when executed by the processor provides, via the wireless communication interface and using the Bluetooth connectivity, a user interface to the portable hand-held electronic device for operating the fieldbus controller, wherein the user interface includes:
- a configuration interface for configuring an operating mode of the plurality of I/O modules, wherein the configuration interface includes an interface for configuring the plurality of I/O modules by defining a type of each of the plurality of I/O modules, and wherein defining the type of each of the plurality of I/O modules include selecting the type of I/O module to be at least one of a PNP module or an NPN module;
- a monitor interface for reading status information from the plurality of I/O modules; and
- a control interface for controlling a state of the plurality of I/O modules, the state of the plurality of I/O modules affecting a state of the controlled device.

11. The fieldbus controller of claim 10, further comprising computer executable instructions that are executed by the processor to download via the wireless communication interface an application from the fieldbus controller onto an electronic device, wherein the application is configured to provide the user interface on a display of the electronic device.

12. The fieldbus controller according to any one of claim 10, wherein the configuration interface includes an interface for configuring the plurality of I/O modules to at least one of restore factory defaults of the plurality of I/O modules, edit configuration parameters for the plurality of I/O modules, or update I/O module identification numbers.

13. The fieldbus controller according to claim 10, wherein the wireless communication interface is configured to provide the Bluetooth connectivity upon activation of a Bluetooth connection remotely over a wireless network.

14. The fieldbus controller according to claim 10, further comprising a Bluetooth hardware button, wherein the wireless communication interface is configured to provide the Bluetooth connectivity upon activation of the Bluetooth hardware button on the fieldbus controller.

* * * * *